(12) United States Patent
Smelt

(10) Patent No.: US 6,349,077 B1
(45) Date of Patent: *Feb. 19, 2002

(54) APPARATUS FOR PLAYING BACK INFORMATION DIGITALLY STORED ON AN OPTICAL RECORD CARRIER USING NAVIGATION PARAMETERS

(75) Inventor: Gerardus J. A. Smelt, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/431,497

(22) Filed: Nov. 1, 1999

(30) Foreign Application Priority Data

Oct. 30, 1998 (DE) .......................................... 198 50 020

(51) Int. Cl.⁷ ............................................. G11B 17/22
(52) U.S. Cl. ........................................................ 369/32
(58) Field of Search .......................... 369/32, 33, 47.1, 369/47.15, 47.16, 47.23; 386/95, 125, 126

(56) References Cited

U.S. PATENT DOCUMENTS

| | | | |
|---|---|---|---|
| 4,882,719 A | * 11/1989 | Kimura et al. | ................. 369/32 |
| 4,922,476 A | * 5/1990 | Kiyoura et al. | ................ 369/32 |
| 5,157,646 A | * 10/1992 | Amemiya et al. | ............. 369/32 |
| 5,241,659 A | * 8/1993 | Parulski et al. | ................. 369/32 |
| 5,301,172 A | * 4/1994 | Richards et al. | ............... 369/32 |
| 5,543,925 A | * 8/1996 | Timmermans | ................ 386/40 |
| 5,633,726 A | * 5/1997 | Timmermans | ................ 386/70 |
| 6,016,381 A | * 1/2000 | Taira et al. | ..................... 386/95 |

FOREIGN PATENT DOCUMENTS

WO          9809290 A1     3/1998

* cited by examiner

Primary Examiner—Tan Dinh
(74) Attorney, Agent, or Firm—Michael E. Belk

(57) ABSTRACT

The invention relates to an apparatus for playing back information digitally stored on an optical record carrier, comprising a control circuit by means of which the display and/or reproduction of information, particularly video and/or audio information is selectable and/or controllable, a parameter memory for storing navigation parameters during playback of a record carrier, wherein the apparatus comprises a first non-volatile memory (9) which is controllable by means of the control circuit (6), the first non-volatile memory (9) is provided for storing navigation parameters, the navigation parameters are stored together with record carrier identification information allowing assignment of the navigation parameters to the relevant record carrier (3), and at the start of a playback process of a record carrier, the navigation parameters assigned to said record carrier (3) are readable from the first non-volatile memory (9) and writable into the parameter memory (6a).

10 Claims, 4 Drawing Sheets

APPARATUS FOR PLAYING BACK INFORMATION DIGITALLY STORED ON AN OPTICAL RECORD CARRIER USING NAVIGATION PARAMETERS

FIELD OF THE INVENTION

The invention relates to an apparatus for playing back information digitally stored on an optical record carrier, comprising a control circuit by means of which the display and/or reproduction of information, particularly video and/or audio information, is selectable and/or controllable, a parameter memory for storing navigation parameters during playback of a record carrier.

BACKGROUND OF THE INVENTION

An apparatus of this type is known from, for example, WO 98/09290. This known apparatus is provided for playing back digital video record carriers. To control the display of the audio and/or video program, the known apparatus has navigation commands and navigation parameters. Generally, those parameters are understood to be navigation parameters whose information is stored by the playback apparatus during the playback process. The navigation parameters comprise, for example, parameters to which a predetermined function is assigned and also parameters which can be freely used by the provider and are, for example, usable for modifying the behavior of the playback apparatus or for storing the user-performed operations, decisions and/or wishes. Navigation commands and navigation parameters are the basis for providers of record carriers for creating different title structures. The providers can use the navigation commands and navigation parameters for adjusting or changing the status of the playback apparatus, for example, for implementing a parental control system which denies children access to predeterminable video programs.

For example, logic AND and OR combinations, comparative operators such as EQUAL/UNEQUAL or register commands are available as navigation commands.

The provider can define simple and complex branch structures in a title by means of the navigation commands and the navigation parameters.

The navigation parameters of record carriers based on the DVD standard are set to zero at the start and the end of a playback process of a record carrier.

SUMMARY OF THE INVENTION

It is art object of the invention to provide an apparatus of the type described in the opening paragraph, rendering playback of navigation parameters assigned to a record carrier usable for playback at a later stage.

According to the invention, this object is achieved in that the apparatus comprises a first non-volatile memory which is controllable by means of the control circuit, in that the first non-volatile memory is provided for storing navigation parameters, in that the navigation parameters are stored together with record carrier identification information allowing assignment of the navigation parameters to a record carrier, in that, at the start of a playback process of a record carrier, the navigation parameters assigned to said record carrier are readable from the first non-volatile memory and writable into the parameter memory.

The navigation parameters assigned to a playback process can thus be stored in the first non-volatile memory and made available for playback at a later stage. During storage in the first non-volatile memory, the navigation parameters are provided during storage with record carrier identification information, for example, a record carrier identification number. This record carrier identification number is stored at a predeterminable location on the record carrier. At the start of a playback process, the control circuit checks whether the relevant record carrier is provided with record carrier identification information. If the relevant record carrier is provided with record carrier identification information, the control circuit checks whether navigation parameters corresponding to this record carrier identification information are stored in the first non-volatile memory. If this is the case, the navigation parameters are read from the first non-volatile memory and written into the parameter memory. Alternatively, an access path to these navigation parameters can be formed. If no navigation parameters relating to record carrier identification information have been stored in the first non-volatile memory, the written record carrier identification information is preferably written by the control circuit into the first non-volatile memory, or a relevant access path is formed. Both a RAM memory and a register memory may be used as a parameter memory.

The apparatus according to the invention has the advantage that, by means of storage of the navigation parameters, an exchange of information between different playback processes is possible. The exchange of information may be realized both between different playback processes of one and the same record carrier. It is also possible to utilize the playback navigation parameters of a first record carrier for playback of a second record carrier. This is particularly advantageous for series of record carriers, for example for a training course comprising several record carriers.

The embodiment of the invention as defined in claim 2 has the advantage that, by means of the interface, an exchange of data relating to the navigation parameters with an external input and/or output apparatus is possible. On the one hand, the playback process of the record carrier can thereby be changed and influenced by means of an external input apparatus. On the other hand, the navigation parameters stored in the first non-volatile memory can be externally read and evaluated. It is particularly possible to provide predetermined navigation parameters for playing back a record carrier, i.e. the playback mode of this record carrier and, for example, given playback sequences can be fixed in advance in that, as defined in claim 11, navigation parameters determining the playback process for the record carrier are stored in advance in the first non-volatile memory. For example, it is possible to place playback apparatuses at different locations in a museum and store different navigation parameters for the same record carrier. This renders it possible that the same record carrier is played back on the different playback apparatuses, i.e. different playback apparatuses play, for example, different chapters, sections or contents on the same record carrier.

The advantageous embodiment of the invention as defined in claim 3 has the advantage that the navigation parameters stored in the first non-volatile memory are updated in a predeterminable manner.

By means of the advantageous embodiment of the invention as defined in claim 4, the temporal history of the change of navigation parameters can be recorded during one or more playback processes. This may be used to particular advantage for market research, error search and the like. The second non-volatile memory is advantageously realized, as defined in claim 5, as a serial, cyclic buffer memory. The navigation parameters are temporally and serially written into the buffer memory. When the buffer memory is full, the oldest navigation parameters are erased so as to make room for new, updated navigation parameters. Such a serial, cyclic buffer memory is a simple and low-cost facility for storing temporal sequences of the navigation parameters. The further embodiment of the invention as defined in claim 6 has the advantage that the temporal sequences of the navigation parameters are externally readable and further processable.

The invention as defined in claim 7 is particularly suitable for apparatuses based on the DVD video standard. In accordance with the DVD video standard, 16 general parameters are provided as navigation parameters which have a length of 2 bytes each. These general parameters are available for the providers of record carriers so as to store the operation behavior of the user and to influence or control the behavior of the playback apparatus. The general parameters can be accessed by means of navigation commands. By storing the general parameters in the first non-volatile memory, information about a playback process of a record carrier can be stored. This information may be loaded from the non-volatile memory for playback at a later stage of the same record carrier or for playback at a later stage of another record carrier and used as a basis for the later playback process.

As defined in claim 8, the apparatus according to the invention is particularly suitable for apparatuses based on the High Quality Video Standard (HQ-Video). In accordance with the HQ-Video standard, at least 16 user parameters of 2 bytes each are provided as navigation parameters. According to the invention, these user parameters are stored in the first non-volatile memory and are thus available for playback at a later stage.

In accordance with the DVD standard, the general parameters are set to the value of zero at the start and the end of every playback process.

In accordance with the HQ-Video CD standard, the user parameters are undefined at the start and the end of every playback process.

The non-volatile storage of the navigation parameters thus represents a modification outside the DVD standard and the HQ-Video CD standard.

As defined in claim 10, the provider, i.e. the manufacturer and marketing representative of record carriers, can determine himself by means of the provider-characteristic information whether his record carrier is to be played back in accordance with the standard without non-volatile storage of the navigation parameters or whether the facility in the apparatus for non-volatile storage of the navigation parameters is to be used.

These and other aspects of the invention are apparent from and will be elucidated with reference to the embodiments described hereinafter.

DETAILED DESCRIPTION OF THE INVENTION

Figure 1:
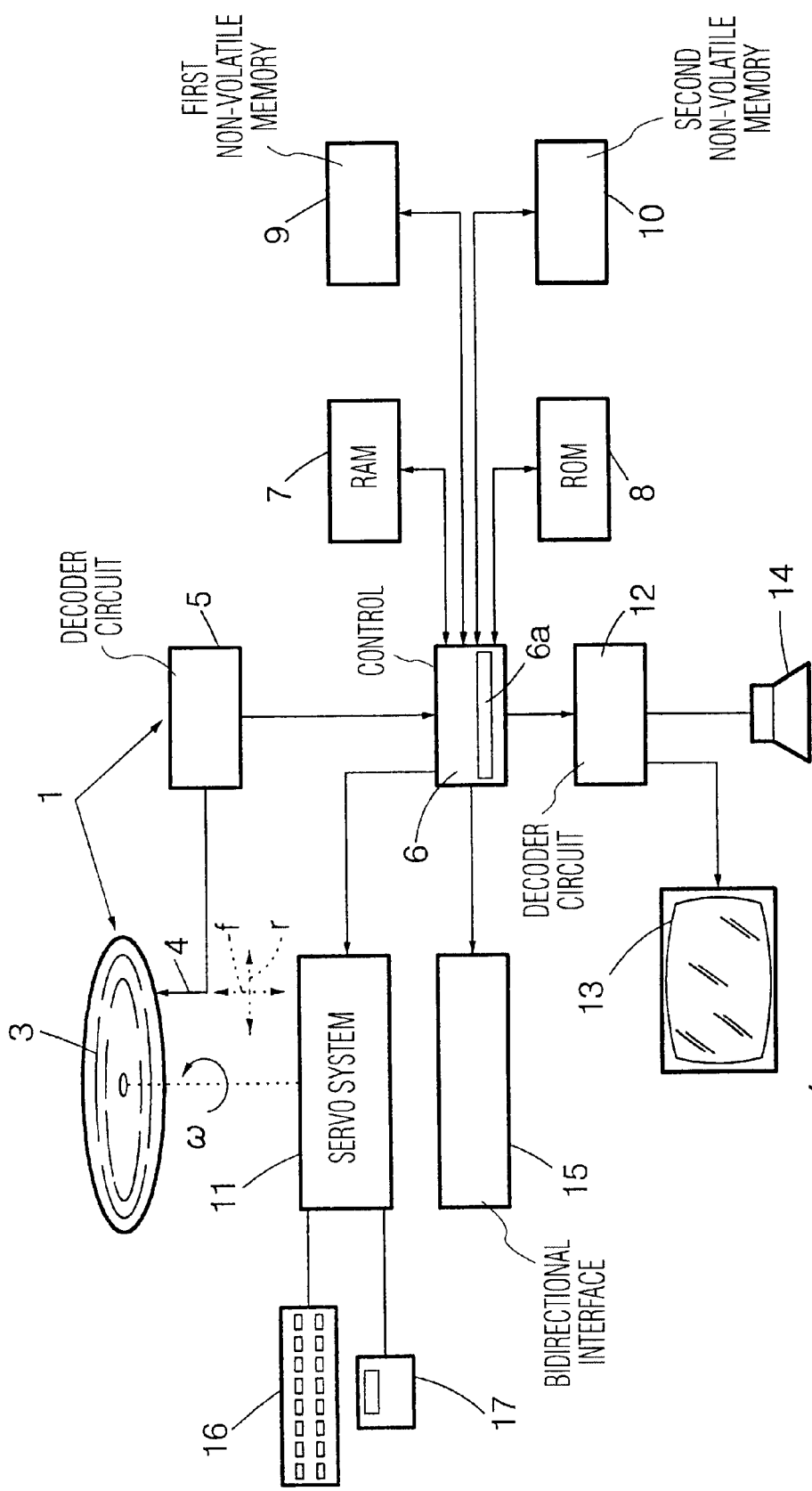
FIG. 1 is a block diagram of an apparatus according to the invention for playing back information digitally stored on an optical record carrier.

FIG. 1 shows an optical record player system 1 with an optical record player 2 which is provided for playing back information digitally stored on an optical record carrier 3. The optical record carrier 3 is particularly a record carrier based on the DVD standard, or a record carrier based on the HQ-Video CD standard. The information which is digitally stored on the optical record carrier 3 is read by means of an optical read unit 4 and applied to a decoder circuit 5. The decoder circuit 5 is further provided for error correction. The decoded and error-corrected data are applied to a control circuit 6.

The control circuit 6 is coupled to a RAM memory 7, a ROM memory 8, a first non-volatile memory 9 and a second non-volatile memory 10. The RAM memory 7 and the ROM memory 8 are provided to control and process the data stream which is applied from the decoder circuit 5 to the control circuit 6. The first non-volatile memory 9 and the second non-volatile memory 10 are provided for non-volatile storage of navigation parameters. The control circuit is further coupled to a servosystem 11 which controls the angle velocity ω of the optical record carrier as well as the position of the optical read unit 4 as regards the tracks in the optical record carrier 3. This is denoted by the broken-line arrow r. Furthermore, the servosystem 11 controls the focusing of the optical read unit 4, which is denoted by the broken-line arrow f. The control circuit 6 transmits relevant control signals to the servosystem 11.

The control circuit 6 is also coupled to a decoder circuit 12. The decoder circuit 12 is provided to decode, for example, the video and audio data coded in accordance with the MPEG2 standard. The decoder circuit 12 supplies the decoded video data to a display 13 and the decoded audio data to a loudspeaker or a loudspeaker system 14. For a bidirectional data exchange with external components, the optical record carrier 2 has a bidirectional interface 15. A keyboard 16, an external data memory 17 such as, for example, a disc drive as well as further external components can be connected to the bidirectional interface 15. On the one hand, external data which are supplied, for example, via the keyboard 16 may be applied to the optical record carrier 2 via the bidirectional interface 15. On the other hand, internal data can be applied from the optical record carrier 2 to external components such as, for example, the external data memory 17.

The control circuit 6 has internally a register 6a which is capable of provisionally storing information and supplying it with a short access time.

Figure 2:
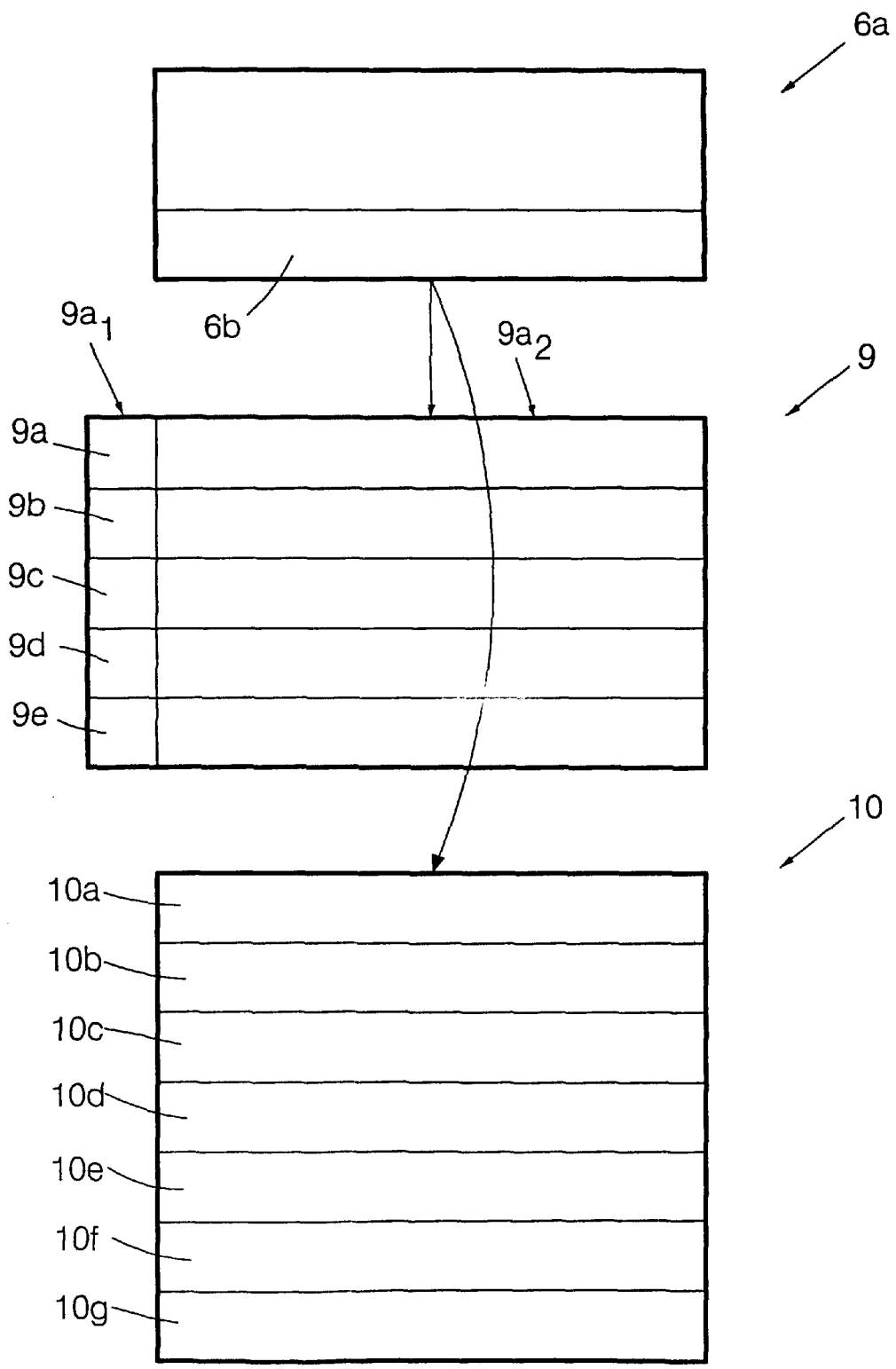
FIG. 2 shows the storage organization for the navigation parameters with a register memory, a first non-volatile address memory and a second non-volatile serial buffer memory.

FIG. 2 shows, by way of example and in greater detail the register 6a, the first non-volatile memory 9 and the second non-volatile memory 10 in accordance with FIG. 1. The memory elements shown in FIG. 2 are dimensioned for apparatuses based on the DVD standard. In accordance with the DVD standard, 16 general parameters are available as navigation parameters, each having a length of 2 bytes. These general parameters are available as standards for the providers of optical record carriers so as to, for example, store the operation behavior of the user and/or influence or control the behavior of each playback apparatus. The register 6a has a memory field 6b of 32 bytes which is provided for storing the general parameters. The first non-volatile memory 9 has five memory fields 9a to 9e of 34 bytes each in the example shown. The individual memory fields 9a to 9e have record carrier identification fields $9a_1$, $9b_1$, $9c_1$, $9d_1$, and $9e_1$, of 2 bytes each, as well as navigation parameter fields $9a_2$, $9b_2$, $9c_2$, $9d_2$ and $9e_2$ of 32 bytes each. The navigation parameter fields $9a_2$ to $9e_2$ are provided for storing the general parameters of the DVD standard. The record carrier identification fields $9a_1$ to $9e_1$ are provided for storing a record carrier identification number which provides the possibility of an assignment between the stored general parameters and the relevant record carrier corresponding to these general parameters. The second non-volatile memory 10 is constituted by a serial, cyclic buffer memory. In the following example, it has seven memory fields 10a, 10b, 10c, 10d, 10e, 10f and 10g comprising 32 bytes each. The second non-volatile memory 10 is provided to store a temporal sequence of the general navigation parameters. In the relevant example, the second non-volatile memory has no record carrier identification fields so as to save memory locations and realize the memory in a possibly simple manner. However, it is also possible to provide a plurality of serial cyclic memories and give them a record carrier identification field so as to be able to store also temporally serial sequences of the general navigation parameters of different record carriers. The memory fields 9a to 9e of the first non-volatile memory 9 can be addressed individually. The second non-volatile memory 10 has only one common memory address. Navigation parameters to be newly stored are always initially written into the upper memory field 10a of the second non-volatile. memory 10. In the subsequent storage process, the new navigation parameters are stored in the upper memory field 10a, and the navigation parameters which are already present in the second non-volatile memory 10 are shifted one memory field further down, i.e. the navigation parameters of the memory field 10a are shifted into the memory field 10b, the navigation parameters of the memory field 10b are shifted into the memory field 10c, and so forth. The navigation parameters stored in the lowest memory field 10g are erased at a subsequent, new storage process. Thus, the seven last stored general navigation parameters are present in the second non-volatile memory 10.

Figure 3:
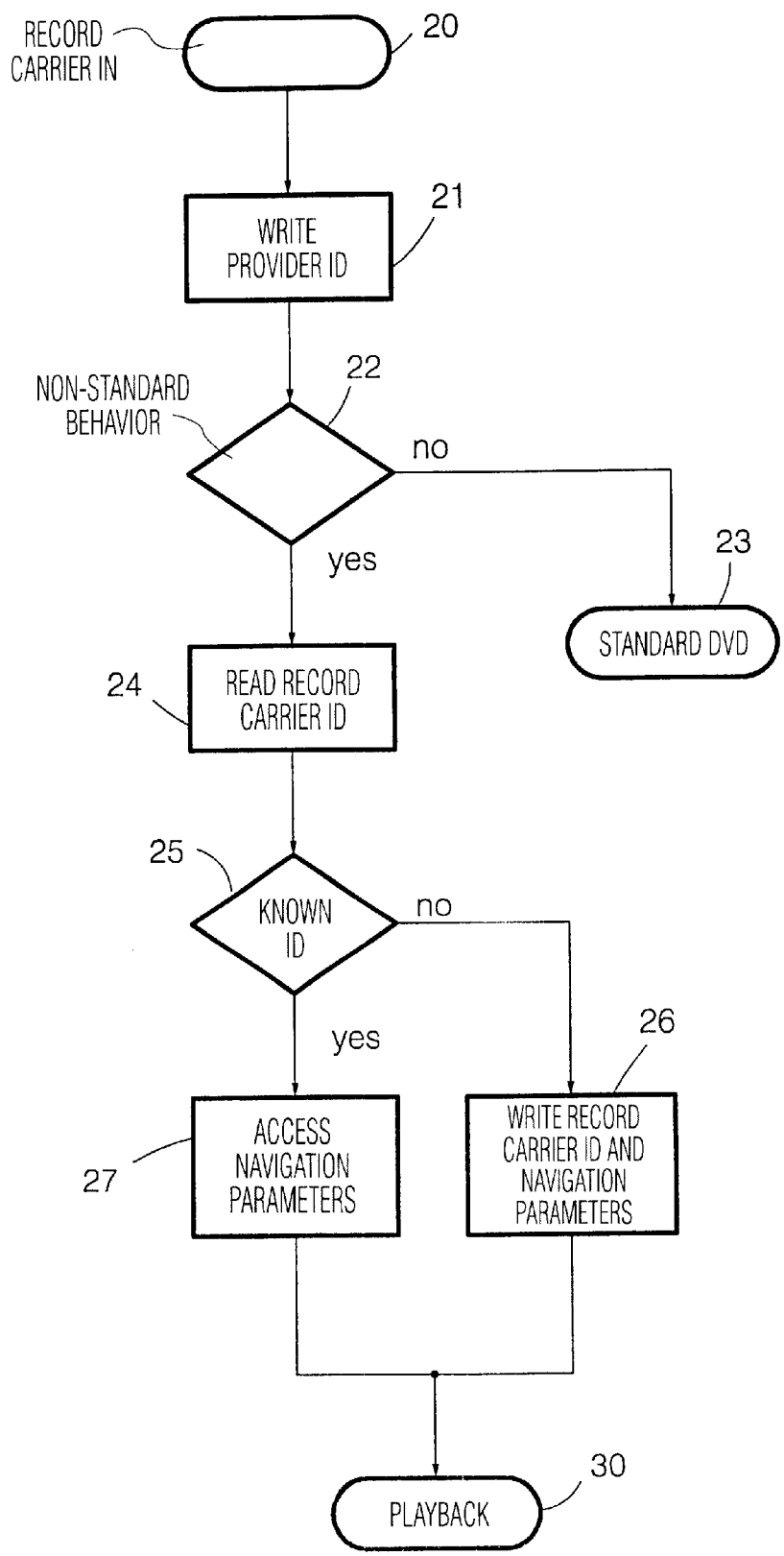
FIG. 3 is a flow chart illustrating the operation of writing a record carrier based on the DVD standard.

FIG. 3 shows a flow chart of the process of writing a record carrier based on the DVD standard. This writing process is performned whenever a record carrier 3 is inserted into the optical record player 2.

A first block 20 represents the result "record carrier-in", i.e. an optical record carrier 3 has been inserted into the optical record player 2 in accordance with FIG. 1. Subsequently, a provider ID is written in a block 21. The provider ID is characteristic information which is stored in a standard form on a defined location of the DVD record carrier. With reference to the provider ID, it is checked in a subsequent step 22 whether the optical record player 2 is to operate in accordance with the DVD standard or whether, in accordance with the provider ID, a non-standard behavior is desired by the provider. To this end, the four last letters of the provider ID are checked in the block 22. When these four last letters have a given letter combination, for example, the letter combination GRPM, then the optical record player 2 recognizes that the provider has provided a non-standard playback behavior, i.e. a non-volatile storage of the general navigation parameters.

In accordance with the DVD standard, the general navigation parameters are set to zero at the start and the end of every playback process. Therefore, it is not possible in the case of standard behavior of the DVD apparatus to store data relating to a playback process of a CD and to make them available for playback at a later stage. This possibility is provided by the non-standard behavior of the optical record player 2. When the four last letters of the provider ID are unequal to GRPM, then the optical record player switches to the standard DVD behavior, which is shown in the block 23 in FIG. 3. When the four last letters of the provider ID are equal to GRPM, then the optical record player recognizes that it is not to operate in accordance with the DVD standard, i.e. the general parameters are not to be set to zero at the start and the end of a playback process. In the block 24, a record carrier identification number is therefore initially read from the record carrier. This record carrier identification number is stored at a defined location on the record carrier. In a subsequent step 25, it is checked whether the record carrier identification number is known to the optical record player, i.e. whether already general navigation parameters are already stored under this record carrier identification number in the first non-volatile memory. If this is not the case, the record carrier identification number is written in a step 26 into one of the record carrier identification fields $9a_1$ to $9e_1$ and the assigned memory field is thus initialized for storage of the assigned navigation parameters. To this end, one of the memory fields 9a to 9e, which is not yet occupied, is selected. When all memory fields 9a to 9e are occupied with information, the memory field having the oldest information is erased and made available for the new record carrier identification number. Simultaneously, the access path is formed for the envisaged memory field.

When it is determined in block 25 that the record carrier identification number is known and that general navigation parameters for this record carrier identification number are stored in the first non-volatile memory 9, then the access path is formed in a step 27 for that memory field of the memory fields 9a to 9e in which the general navigation parameters assigned to the relevant record carrier identification number are stored.

In the subsequent playback process, represented by the block 30, the general navigation parameters stored at the end of the previous playback process of the record carrier are now available.

Figure 4:
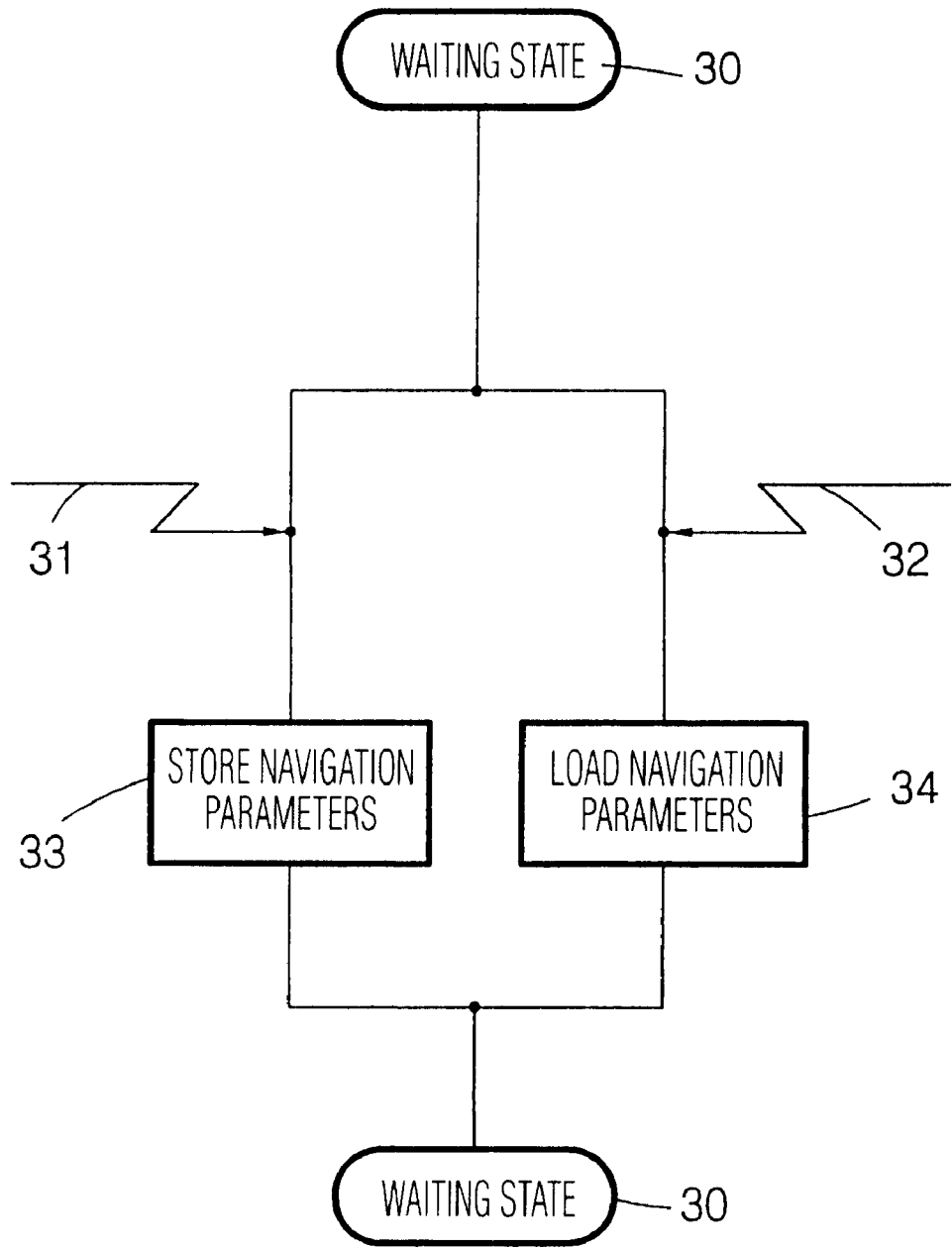
FIG. 4 is a flow chart illustrating the storage of the general parameters in the first and/or the second non-volatile memory during playback of a DVD record carrier.

FIG. 4 shows a flow chart of storing the general parameters in the first non-volatile memory 9 and in the second non-volatile memory 10, as well as loading the general parameters from the first non-volatile memory 9 during playback of a DVD record carrier, which storage and loading are controlled by means of the control circuit 6. Initially, the optical record player 2 is in a waiting state 30 as regards the first non-volatile memory 9 and the second non-volatile memory 10. During this waiting state 30, a playback process of the optical record carrier 3 takes place, i.e. the control circuit 6 is continuously supplied with information by means of the optical read unit 4 and the decoder circuit 5. In accordance with the information applied to the control circuit 6, also the general navigation parameters stored in the memory field 6b of the register 6a may change. The change of the general navigation parameters is dependent on the way in which the provider of the record carrier makes use of the general navigation parameters. The provider of the record carrier may determine, by corresponding program sequence structures on the record carrier, when and under what conditions the general navigation parameters are to be written from the register 6a into the first non-volatile memory 9 and/or the second non-volatile memory 10. For this purpose, two specific commands are provided, which are recognized by the control circuit 6. As a first control command, an addition of the value of zero to the memory field 6b of the register 6a is provided. Such an addition of the value of zero does not change anything in the memory field 6b of the register 6a. The control circuit 6 of course recognizes that such a control command not influencing the register 6a was present in the data stream supplied by the record carrier 3. This result "addition of zero to the memory field 6b of the register 6a" is denoted by the reference numeral 31 in the FIG. 4 flow chart. When this result 31 occurs, the control circuit 6 stores the general parameters stored in the memory field 6b of the register 6a in the first non-volatile memory 9 under the relevant record carrier identification number as well as simultaneously in the upper memory field 10a of the second serial non-volatile memory 10. This is shown as block 33 in FIG. 4. After performing this storage, the optical record player 2 again assumes the waiting state 30. A further control command relating to the first non-volatile memory 9 is the control command "subtract zero from the general navigation parameters stored in the memory field 6b". This result is denoted by the reference numeral 32 in the FIG. 4 flow chart. The value of the general navigation parameters stored in the memory field 6b is neither changed by this "subtract zero" command. However, the control circuit 6 recognizes when such a command is present in the data stream read from the optical record carrier 3. When this control command is recognized, the control circuit 6 loads the general navigation parameters from the first non-volatile memory 9 into the memory field 6b of the register 6a. Subsequently, the system changes to the waiting state 30 again as regards the storage operations of the first non-volatile memory 9 and the second non-volatile memory 10.

The general navigation parameters stored in the first non-volatile memory 9 and in the second non-volatile memory 10 may be both externally read and externally changed by means of the bidirectional interface 15. For external reading, an external data processing unit may be used. For external influencing, for example, pagers, a keyboard or a bar code reader are feasible.

The system according to the invention thus provides the possibility of storing intermediate results of a playback process of a record carrier in the first non-volatile memory 9 and in the second non-volatile memory 10 and making them available for playback at a later stage. Furthermore, the serial, second non-volatile memory provides the possibility of recording temporal sequences of the change of the general navigation parameters, reading them via the bidirectional interface 15 and then evaluating them by means of external data processing units.

Moreover, the bidirectional interface provides the possibility of externally writing information for playback of a record carrier into the first non-volatile memory 9 and thereby externally influence and control playback of the record carrier.

What is claimed is:

1. An apparatus for playing back information digitally stored on an optical record carrier, comprising a control circuit by means of which the display or reproduction of information, including video or audio information is selectable or controllable, a parameter memory for storing navigation parameters during playback of a record carrier, wherein the apparatus comprises a first non-volatile memory which is controllable by means of the control circuit, wherein the first non-volatile memory is provided for storing navigation parameters, wherein the navigation parameters are stored together with record carrier identification information allowing assignment of the navigation parameters to the relevant record carrier, wherein, at the start of a playback process of a record carrier, the navigation parameters assigned to said record carrier are readable from the first non-volatile memory and writable into the parameter memory, and wherein the apparatus comprises a second non-volatile memory which is provided for storing temporal sequences of the navigation parameters.

2. An apparatus as claimed in claim 1, wherein the apparatus has an interface by means of which navigation parameters are externally writable or externally readable into or from the first non-volatile memory.

3. An apparatus as claimed in claim 2, wherein navigation parameters are stored in the first non-volatile memory at the end of each playback process or in predetermined time intervals or in the case of external change of the navigation parameters.

4. An apparatus as claimed in claim 1, wherein the second non-volatile memory is a serial, cyclic buffer memory into which the temporal sequences of the navigation parameters are serially written.

5. An apparatus as claimed in claim 4, wherein the apparatus has a serial interface by means of which the contents of the second non-volatile memory are serially readable.

6. An apparatus as claimed in claim 1, wherein the apparatus is a DVD apparatus for playing back record carriers in accordance with a DVD standard, and in that the general parameters based on the DVD standard are provided as navigation parameters for storage in the first non-volatile memory.

7. An apparatus as claimed in claim 1, wherein the apparatus is a HQ-Video apparatus for playing back record carriers in accordance with a HQ-Video standard, and in that the user parameters based on the HQ-Video standard are provided as navigation parameters for storage in the first non-volatile memory.

8. The apparatus as claimed in claim 1, wherein the apparatus is used for playing back a set of record carriers, in which, by means of storing the navigation parameters assigned to the relevant record carriers of the set, a transfer of information between the individual record carriers of the set is made possible.

9. An apparatus as claimed in claim 1, wherein at the start of a playback process, the apparatus is provided for reading provider-characteristic information from the record carrier, the provider-characteristic information comprising information on whether the provider of the record carrier uses or wishes to use the first non-volatile memory, and wherein, in dependence upon this provider-characteristic information, the first non-volatile memory is either used or not used for reading or storing the navigation parameters.

10. The apparatus as claimed in claim 2, wherein the apparatus is used for predetermining the playback process of a record carrier, wherein the navigation parameters influencing the playback process of the record carrier are stored in the first non-volatile memory via the interface.

* * * * *